(12) United States Patent
Kemper et al.

(10) Patent No.: US 7,389,275 B2
(45) Date of Patent: Jun. 17, 2008

(54) SYSTEM FOR PERSONAL AUTHORIZATION CONTROL FOR CARD TRANSACTIONS

(75) Inventors: Lynn Kemper, San Carlos, CA (US); Akshey "Shawn" Vij, Mountain View, CA (US); Robin O'Connell, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 852 days.

(21) Appl. No.: 10/093,002

(22) Filed: Mar. 5, 2002

(65) Prior Publication Data

US 2003/0172040 A1   Sep. 11, 2003

(51) Int. Cl.
*G06Q 99/00* (2006.01)

(52) U.S. Cl. .............................. 705/64; 705/26; 370/352

(58) Field of Classification Search .................. 705/26, 705/64, 40; 370/352; 235/439; 713/186
See application file for complete search history.

(56) References Cited

U.S. PATENT DOCUMENTS

| | | | |
|---|---|---|---|
| 5,177,342 A | 1/1993 | Adams | |
| 5,384,449 A | 1/1995 | Peirce | |
| 5,500,513 A | 3/1996 | Langhans et al. | |
| 5,526,409 A | 6/1996 | Conrow et al. | |
| 5,621,201 A | 4/1997 | Langhans et al. | |
| 5,655,007 A | 8/1997 | McAllister | |
| 6,000,832 A | 12/1999 | Franklin et al. | |
| 6,052,675 A | 4/2000 | Checchio | |
| 6,226,624 B1 | 5/2001 | Watson et al. | |
| 6,339,766 B1 | 1/2002 | Gephart | |
| 6,381,584 B1 * | 4/2002 | Ogram | 705/26 |
| 6,456,984 B1 | 9/2002 | Demoff et al. | |
| 6,560,581 B1 | 5/2003 | Fox et al. | |
| 2001/0056409 A1 | 12/2001 | Bellovin et al. | |
| 2002/0035548 A1 * | 3/2002 | Hogan et al. | 705/64 |
| 2002/0138445 A1 | 9/2002 | Laage et al. | |
| 2003/0028481 A1 | 2/2003 | Flitcroft et al. | |

FOREIGN PATENT DOCUMENTS

| | | |
|---|---|---|
| EP | 0745961 A2 | 12/1996 |
| WO | WO 00/46769 A1 | 8/2000 |
| WO | WO 0141093 A1 * | 6/2001 |
| WO | WO 03/001866 A1 | 1/2003 |
| WO | WO 03/083737 A1 | 10/2003 |

OTHER PUBLICATIONS

Hribar, U., Secure electronic transaction, Apr. 2000, University of Maribor, vol. 33, No. 4, pp. 281-285.*

* cited by examiner

*Primary Examiner*—James P. Trammell
*Assistant Examiner*—Behrang Badii
(74) *Attorney, Agent, or Firm*—Townsend and Townsend and Crew LLP

(57) ABSTRACT

An authorization system allows for cardholder-provided parameters to a personal authorization subsystem. The parameters can be selected by the cardholder to limit the authorizations that would otherwise be granted on the card. The parameters can indicate limits by frequency, dollar amount, merchant, geographic location, time of day, combinations thereof, or the like. Authorization for a given transaction, even where authorized by an issuer and a network operator, might be denied based on self-constraints set by the cardholder. In some variations, messages are sent to the cardholder based on constraints set by the cardholder and transactions might be approved and messaged, or denied and messaged.

11 Claims, 8 Drawing Sheets

SYSTEM FOR PERSONAL AUTHORIZATION CONTROL FOR CARD TRANSACTIONS

FIELD OF THE INVENTION

The present invention relates to financial transaction processing systems in general and more specifically to financial transaction processing systems that relate a transaction to a cardholder and include authorization systems that authorize or deny credits or debits related to transactions.

BACKGROUND OF THE INVENTION

Credit card transactions are a common method of effecting payment in connection with a transaction. In a typical transaction, a cardholder selects merchandise or services and presents a card, such as a VISA® credit card, check card or debit card, to a merchant. Before the merchant releases the merchandise or performs the service, the merchant will typically get authorization for a charge in the amount agreed on for the merchandise or service, at the point-of-sale.

Today, most authorizations are electronic, where the merchant obtains the cardholder name, account number and possibly other information. The merchant transmits that information, along with transaction-specific information, possibly including a merchant identifier, a transaction amount and a transaction description. The merchant transmits the information as part of an authorization message directed through an authorization network to a card issuer. When a card issuer approves a transaction, the merchant is given certain assurances that the merchant's bank account will be credited with the amount of the transaction and accordingly is willing to release the goods or services to the purchaser.

The cardholder generally agrees to pay for any transactions applied to the cardholder's account. In some cases, however, the cardholder's issuer financial institution (FI) or the network operator will be liable to the merchant instead of the cardholder, as in the case of a stolen card being used after the cardholder notified the issuer FI. Naturally, the issuer FI and network operator have a large incentive to limit the number of transactions for which they are liable. As a result, the typical merchant agreement requires that the merchant perform an authorization before the risk of nonpayment passes from the merchant to the issuer FI or the network operator and the issuer FI and network operator place constraints on authorizations.

For example, where a card is typically used for small transactions relating to groceries and gasoline, frequent transactions relating to expensive jewelry might prompt the authorization system to deny the transaction as a suspect activity even if ultimately the cardholder is legitimately purchasing jewelry. The denial serves to protect the issuer FI and limit the liability of the issuer FI for transactions that the cardholder might later indicate as being fraudulent. The authorization system would not necessarily deny transactions that were not intended by the cardholder, and is generally limited to denying transactions under conditions that the issuer FI or the network operator might deem indicative of fraud. The issuer FI might also deny authorization where the transaction amount would cause the cardholder's credit limit to be exceeded.

In many cases, the openness and independence of the card network makes it more difficult to control the uses of the cards, but that becomes even more important where the cards used in the card network are so widely accepted and pervasive.

BRIEF SUMMARY OF THE INVENTION

In one embodiment of an authorization system according to the present invention, a cardholder provides parameters to a personal authorization subsystem. The parameters can be selected by the cardholder to limit the authorizations that would otherwise be granted on the card. The parameters can indicate limits by frequency, dollar amount, merchant, merchant type, credit limits, geographic location, time of day, combinations thereof, or the like. In a preferred embodiment, the cardholder provides the parameters to the cardholder's issuer financial institution, which integrates the cardholder authorizations with the issuer financial institution authorization process. The issuer financial institution is independent of the merchants accepting the card and the card network operator operates an open, independent network for accepting the cards of many issuer financial institutions usable with many independent merchants.

For a further understanding of the nature and advantages of the invention, reference should be made to the ensuing description in conjunction with the accompanying drawings

DETAILED DESCRIPTION OF THE INVENTION

Figure 1:
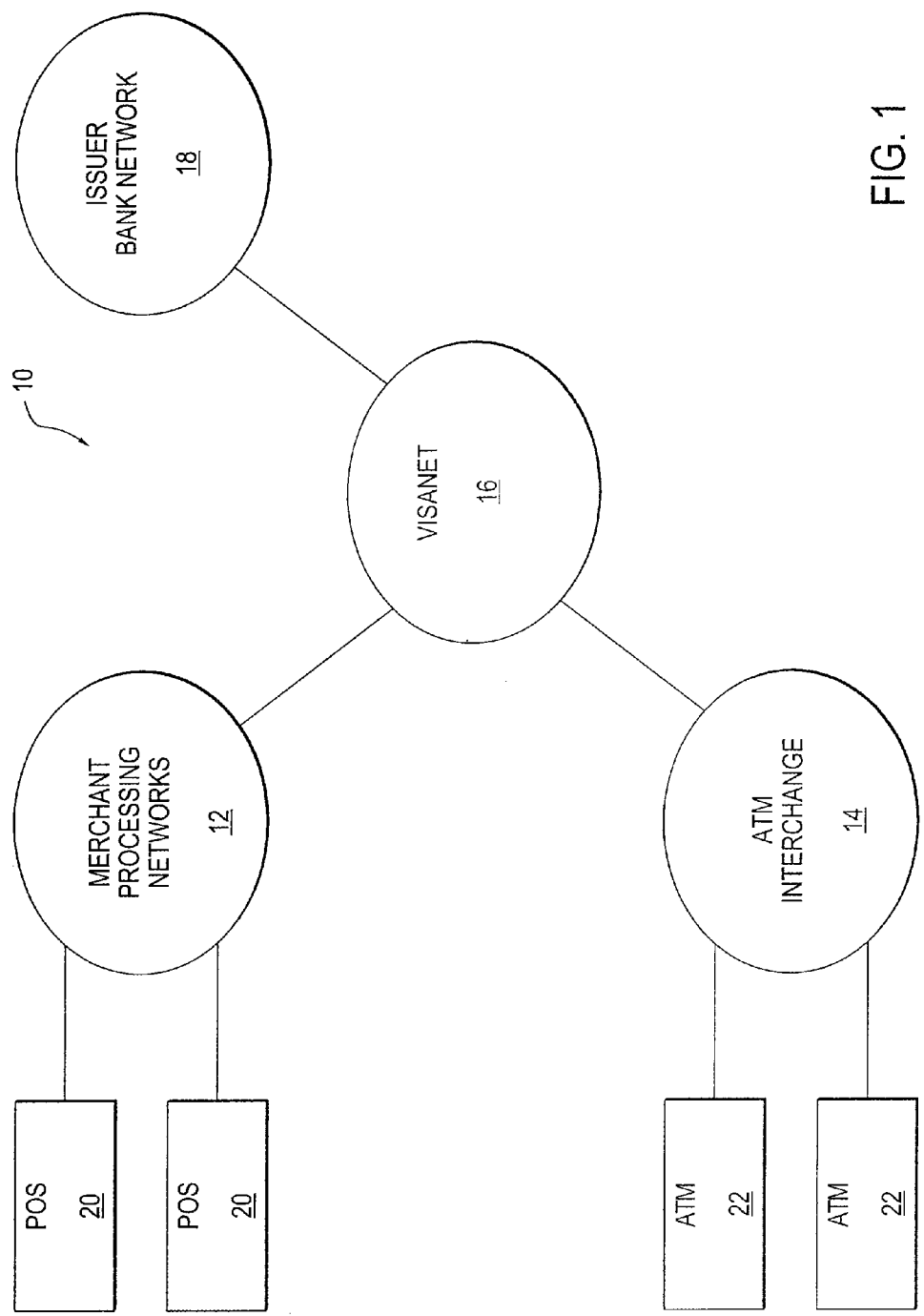
FIG. 1 is a block diagram of a transaction system wherein the present invention might be used.

FIG. 1 is a block diagram of a transaction system 10. As shown there, transaction system 10 includes a merchant processing networks 12, an automated teller machine (ATM) interchange 14 coupled to a transaction network 16, such as the VISANET® network, which is in turn coupled to an issuer bank network 18. As shown, a plurality of point of sale (POS) terminals 20 are coupled to merchant processing network 12 and a plurality of ATM's 22 are coupled to ATM interchange 14. It should be understood that the typical transaction system couples many merchant networks, ATM interchanges and issuer bank networks, in addition to merchant bank networks.

In a typical operation of transaction system 10, a card is presented to a POS terminal 20 and a transaction is generated between a cardholder and a merchant that 1) debits a cardholder's account at the cardholder's issuer bank, 2) credits a merchant's account at the merchant acquirer bank and generates the necessary electronic messages for settlement among the banks and other transaction processing. As part of the transaction, an authorization will be performed, wherein the merchant gathers up the transaction information and sends an authorization request message to the network and receives back an authorization result, such as "approved", "denied", "ask for ID", etc.

Figure 2:
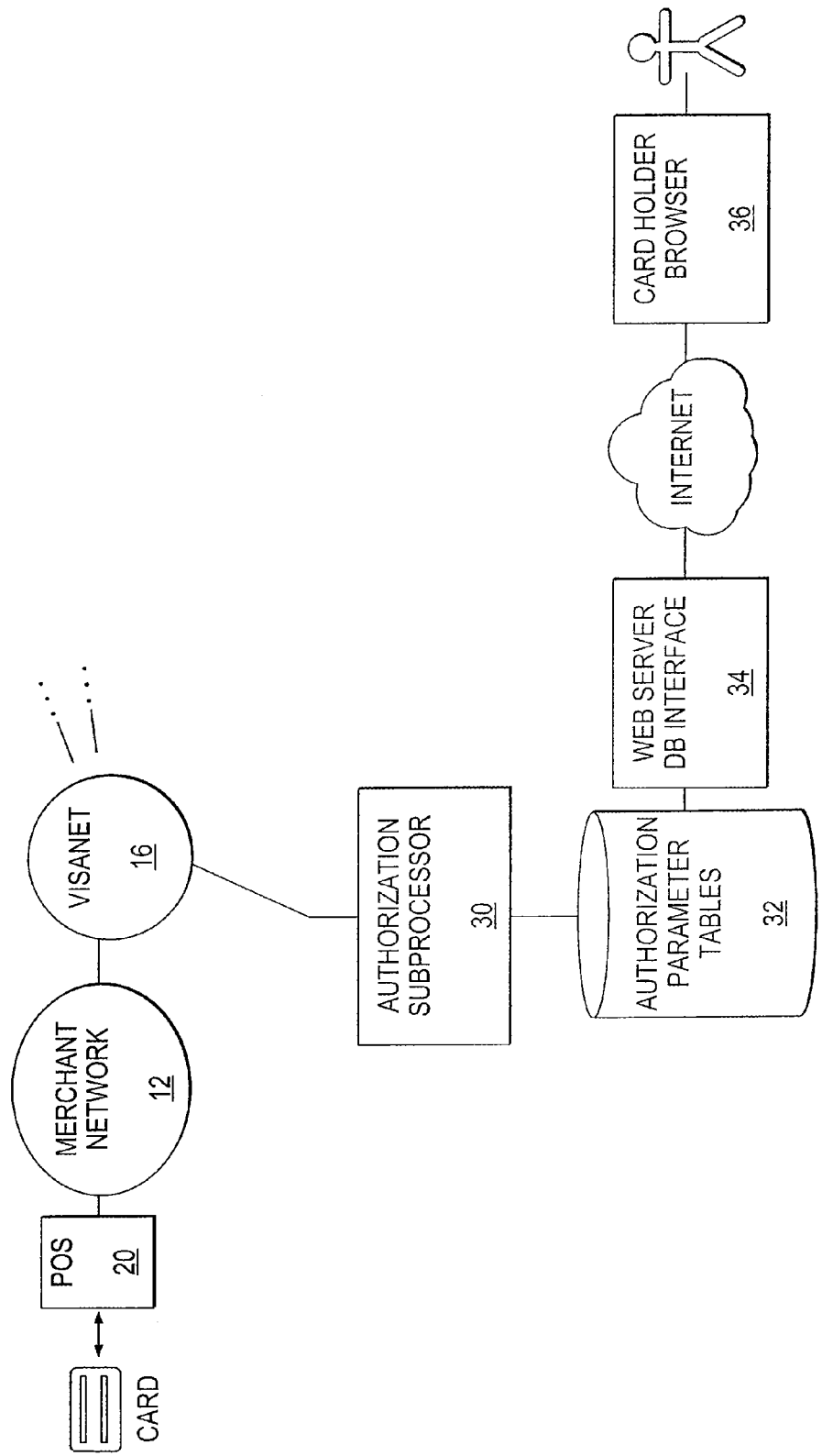
FIG. 2 is a more detailed block diagram illustrating aspects of an authorization subprocessor and a cardholder's interaction with the subprocessor.

FIG. 2 is a more detailed block diagram illustrating aspects of authorization. In one such process, a card is presented to POS terminal 20 which includes means for reading card contents, such as a magnetic card reader or a smartcard reader. POS terminal 20 is coupled to merchant network 12 and transaction network 16, which performs authorizations to protect the issuer FI or the network operator.

Transaction network 16 is also coupled to an authorization subprocessor 30, which can cause an otherwise allowable transaction to be denied, based on cardholder-provided authorization parameters available in an authorization parameter table (APT) of a plurality of authorization parameter tables 32. A cardholder's APT can be populated and updated or modified by a web server database interface 34 under the direction of a web browser 36 operated by the cardholder. As used herein, the cardholder refers to the person or persons that that issuer FI holds responsible for payment. A legitimate card presenter, i.e., the person presenting the card in a transaction, might be the cardholder, but could also be other authorized agents, such as a person to whom an additional card was issued. While this description describes a Web client-server based interface, it should be understood that other interfaces, such as direct connections, local network connections, kiosks, telephone interfaces or the like would be used instead to allow a cardholder to modify the APT associated with that cardholder's account.

Figure 3:
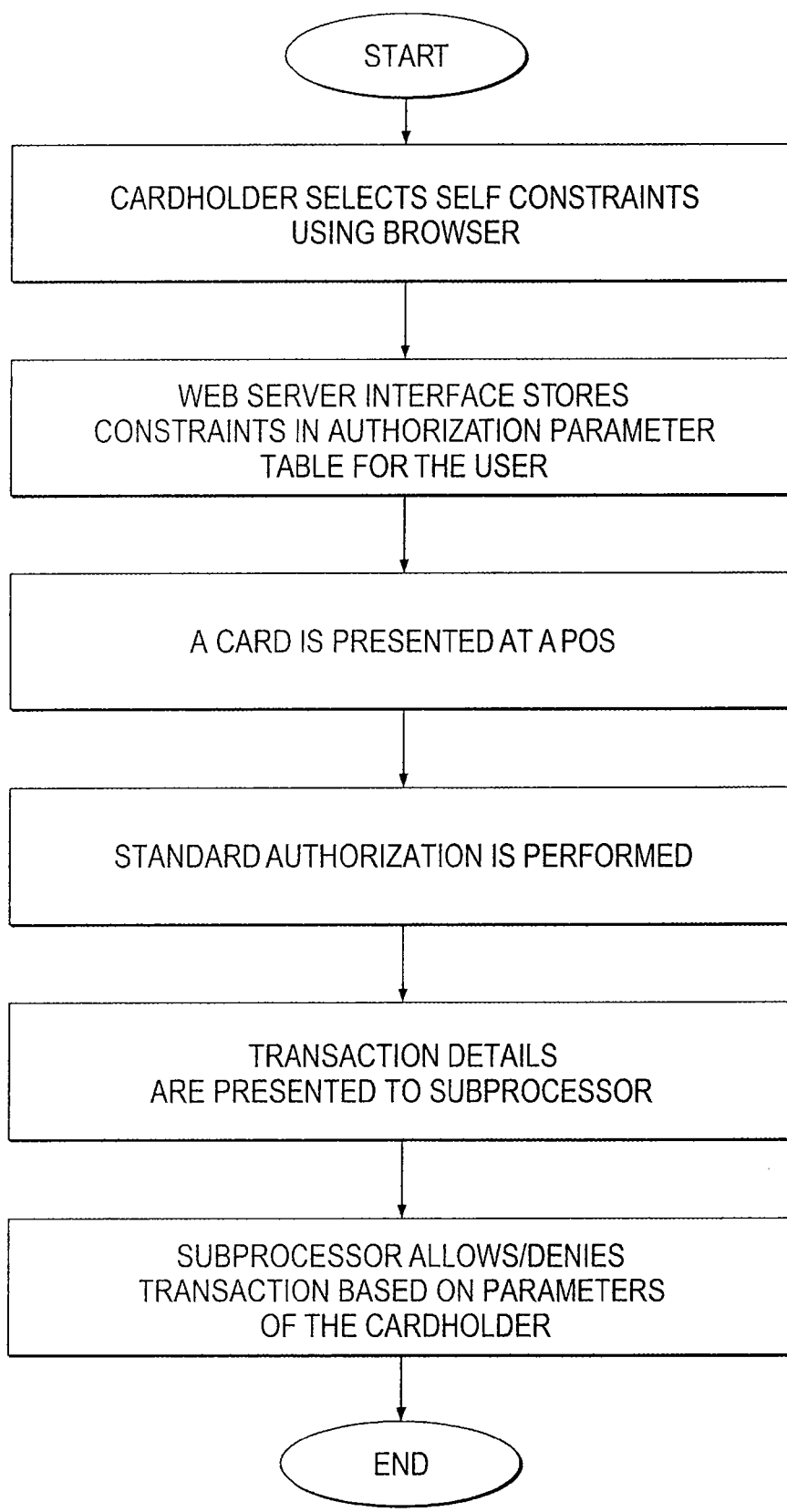
FIG. 3 is a flowchart illustrating a process of authorization control.
Figure 4A:
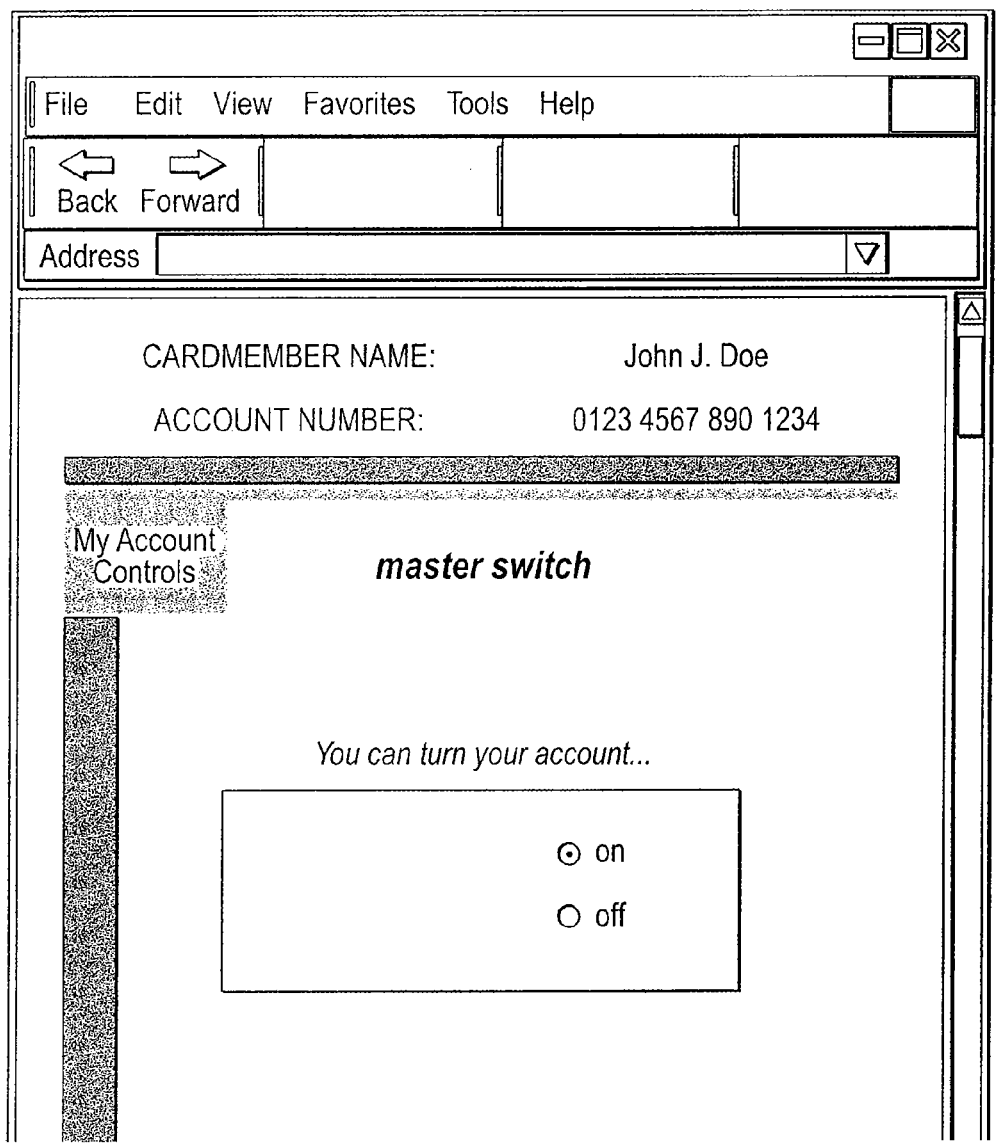
FIGS. 4(a)-(e) illustrate aspects of a user interface usable to set cardholder authorization parameters.
Figure 4B:
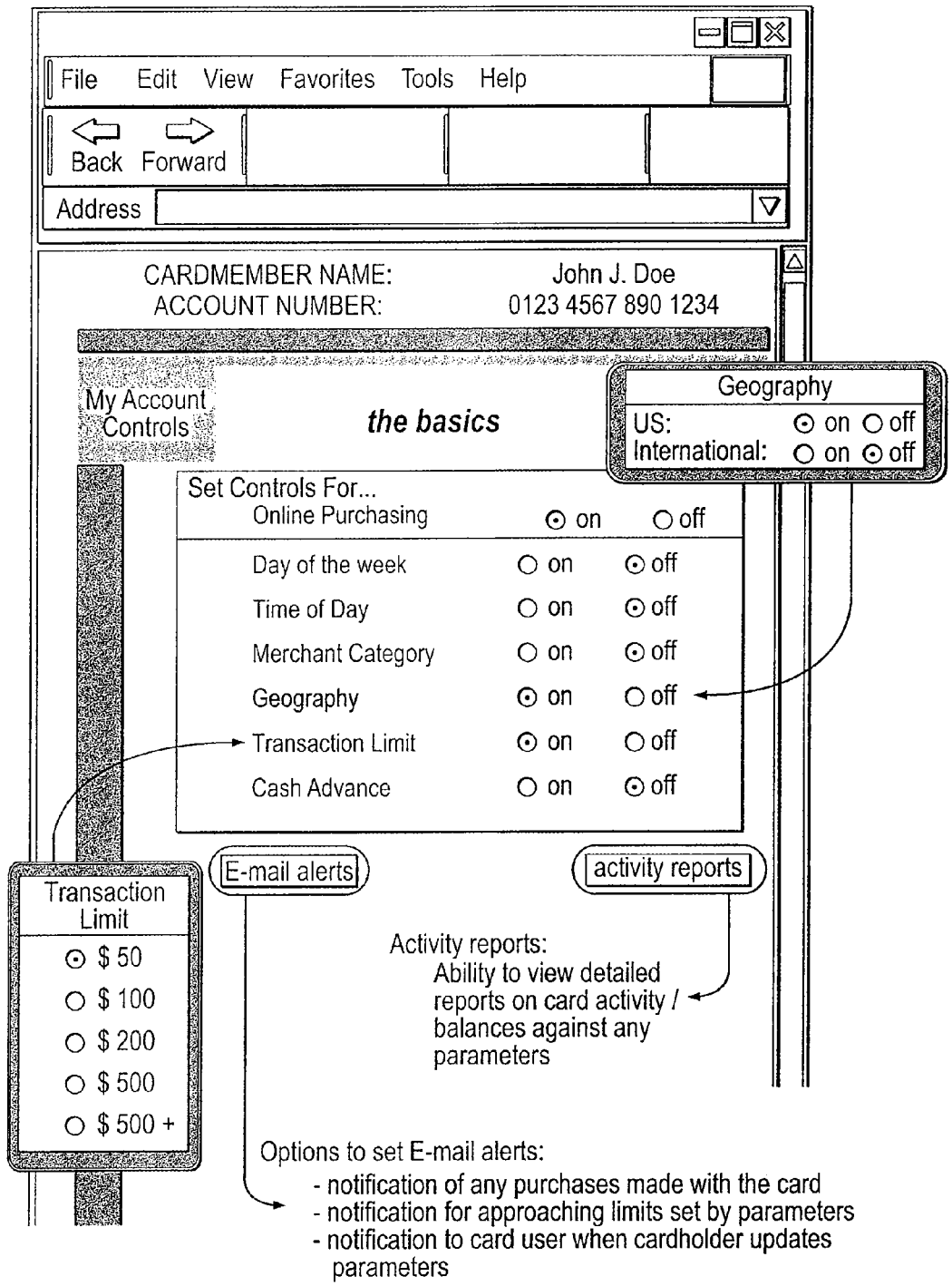
Figure 4C:
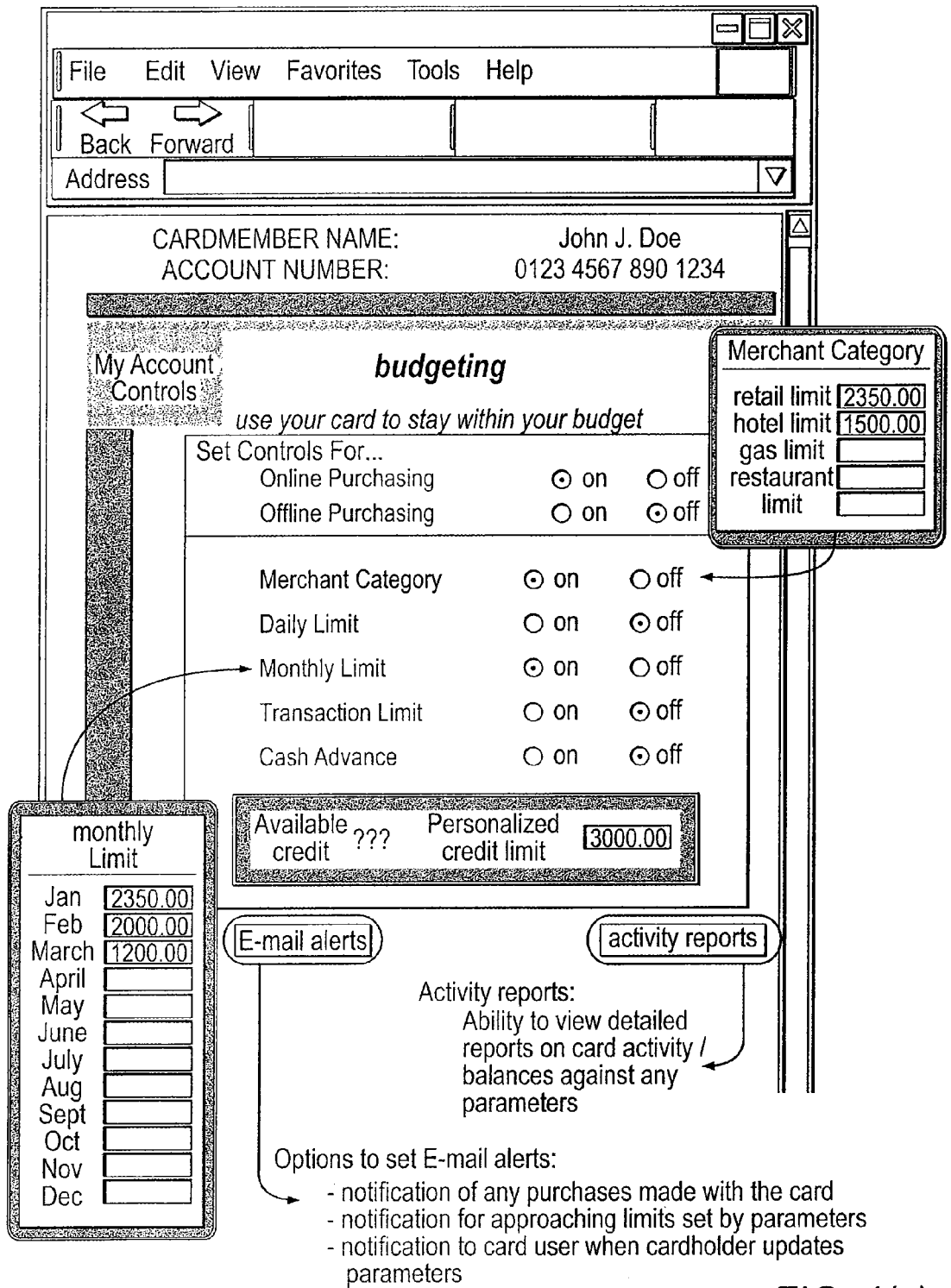
Figure 4D:
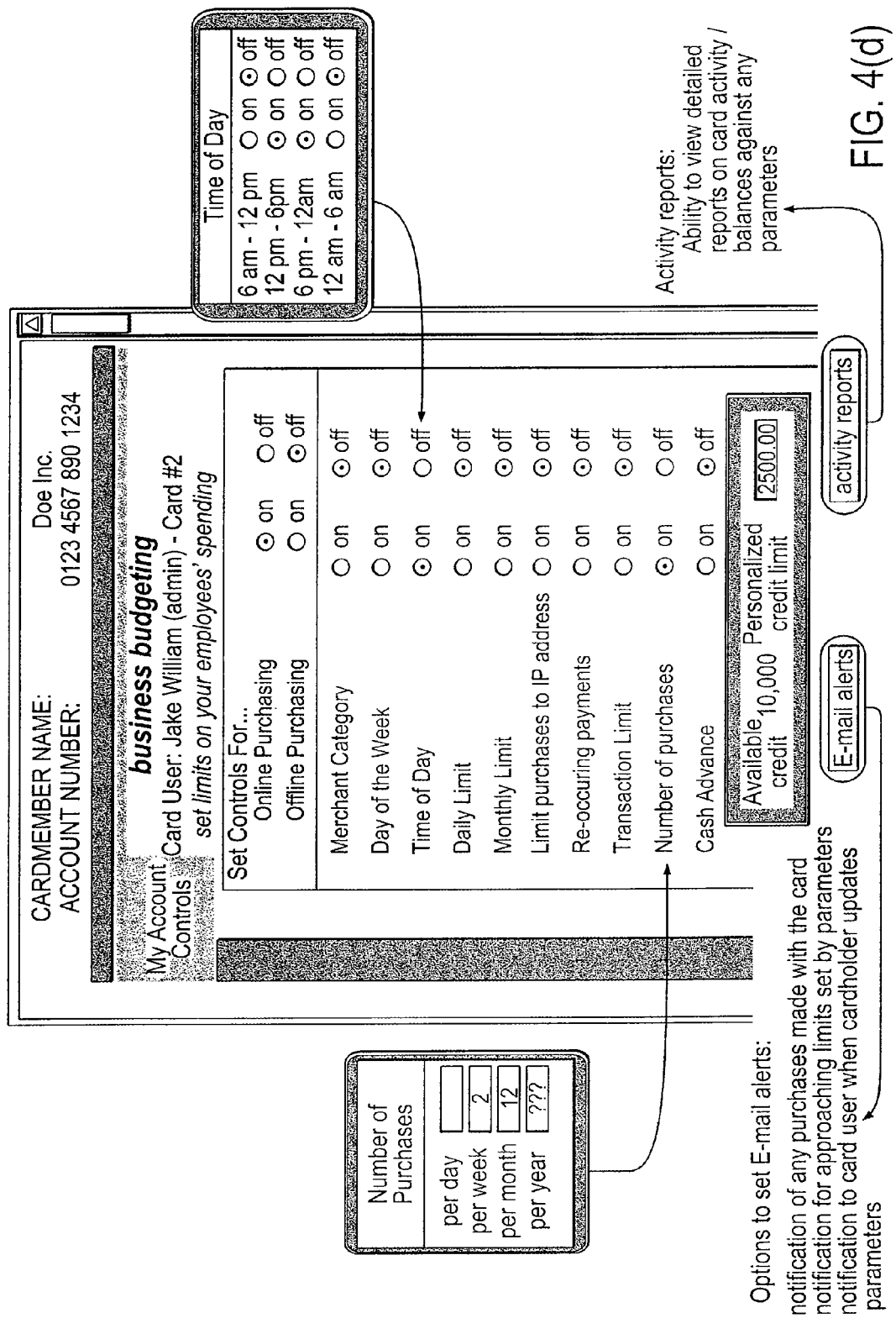
Figure 4E:
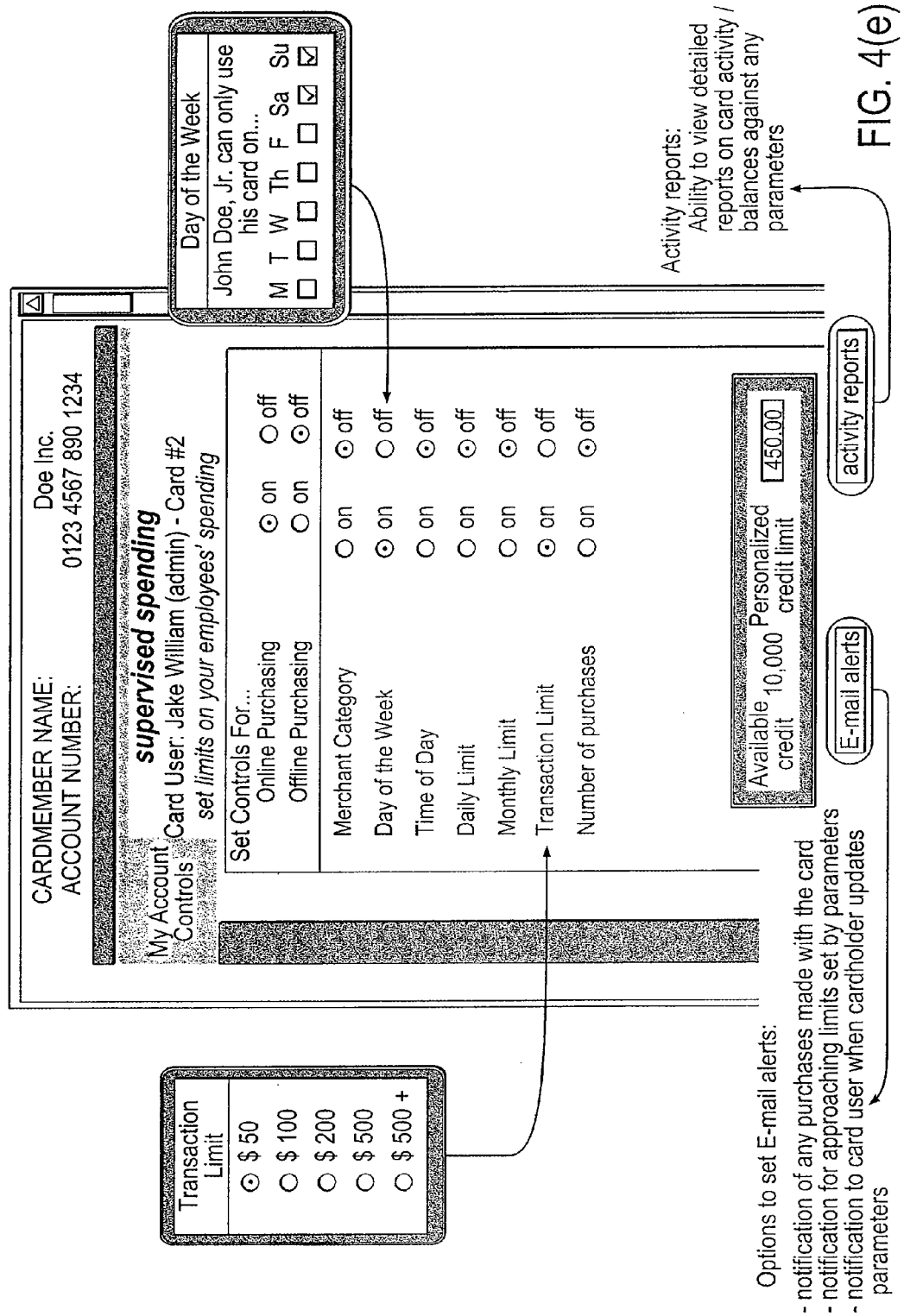

In a typical operation, illustrated in FIG. 3, the cardholder (i.e., one of those ultimately responsible for nonfraudulent transactions on the card) will create, modify or update the corresponding APT to set self constraints using a browser and the linked-to web server interface stores such self constraints in the corresponding APT. Once the APT contains the cardholder supplied self constraint parameters, if a card is presented at a POS terminal, a normal authorization process occurs, wherein the issuer FI or network owner criteria for allowing the transaction are tested. If the issuer FI and network owner would deny the transaction, no further processing is needed and a denial message can be sent to the POS terminal. However, if the issuer FI and network owner would approve the transaction, the transaction details are then presented to the authorization subprocessor. The authorization subprocessor approves or denies the transaction based on the cardholder's APT, which contains constraints set by the cardholder.

While the self constraints are set by the cardholder and therefore could easily be overridden by the cardholder himself or herself, they nonetheless constrain the cardholder's account, at least by denying transactions where the cardholder unintentionally exceeds constraints, another card carrier exceeds the constraints and also constrain fraudulent use of the card that is only detectable in advanced based on constraints set by the cardholder.

The authorization subprocessor is described above as acting to approve or deny a transaction. In some embodiments, the authorization subprocessor might, in addition to or in lieu of approval/denial, perform cardholder notifications. A cardholder notification is a message to the cardholder, or to a system designated by the cardholder, that a transaction occurred and fell within cardholder-set parameters. In some cases, the transaction is also denied, but typically the transaction is allowed, with notification. Such details can be specified by the cardholder in the parameters. The notification messages can be by mail, by telephone, by pager, by e-mail, by instant message, or by other messaging methods currently known or otherwise.

Examples of Constraints

Detailed examples of some of the possible constraints will now be described. Such constraints are specified in the APT. For ease of management, the constraints might be grouped for the cardholder into a few categories of constraints, as follows:

Transaction Type
Deny cash advances, but allow purchases.
Transaction Amount
Allow a transaction below a set limit
Allow transaction if total transactions would remain below a limit (personalized credit limit)
Allow transaction if total transactions in a set time period are below a limit
Daily Limits
Limit on number of transactions
Transaction Details
Allow transaction only during set times of the day (this allows the cardholder to in effect, indicate that any transaction made between midnight and 5 AM is a priori a fraudulent transaction)
Allow transaction only during set times of the week (e.g., movie purchases not allowed during the week)
Allow offline transactions, but not online (telephone, Internet, etc.) transactions
Allow online transactions, but only from prespecified IP addresses
Allow transactions based on geographic location (e.g., block purchases outside U.S.)
Allow transactions based on the merchant category type (e.g., restaurants and hotels but not retail stores)
Other Limits
Preauthorization for one-time transactions
Recurring Payment Authorization
Varying controls from card carrier to card carrier
Instant Cut-off (useful when the cardholder is aware of the theft but the issuer FI has not yet detected it or is still processing the cardholder's request for closing their account.)

Arbitrary combinations of these constraints might also be possible, such as a cardholder specifying that cash advances are allowed within the U.S., but not outside the U.S. and outside the U.S. transactions are allowed, but only for merchants in the food, medical, travel and lodging categories during a prespecified date range. As another example, a parent cardholder might get an e-mail whenever a child card carrier effects an online purchase.

In addition to constraints, the APT might also contain data that directs other actions unrelated to authorization. One such action is ancillary messaging, wherein under cardholder selected conditions, a message (such as a pager message, e-mail message or instant message) is sent to a prespecified address if the conditions are met. Such conditions include card carriers that are minors effecting a transaction with an inappropriate merchant. In some cases, the cardholder might set the condition such that an e-mail is generated with every transaction, thus allowing for the electronic collection of receipts. The messages might be selective, such that only approvals result in messages or only denials result in messages (and might include the reason for the denial).

User Interfaces

Examples of the user interfaces that might be presented to a cardholder via a cardholder browser are shown in FIGS. 4(a)-(e). Other user interfaces might also be used, such as a calendar view where the cardholder could click on calendar days to allow or deny transactions for those dates. Another user interface might provide a listing of various merchant types to allow that cardholder to set predetermined ranges for each of a plurality of merchant types.

Variations

In the above, described system, the cardholder creates, modifies or updates the cardholder's APT via a Web interface. In another variation, the cardholder can interact with a telephone voice response unit (VRU) or automatic response unit (ARU) using the telephone keypad, to interact with a server that performs the requested actions on the APT. In a useful combination, the Web interface is accessible from a Web page maintained by the issuer FI for card customers. Such a Web interface might be provided to show transaction details and other account information. In some embodiments, the e-mail messages sent to the cardholder could include a hypertext link to a page showing details of the transaction so the cardholder can jump directly to a detail page from an e-mail.

Where multiple card carriers (i.e., persons with cards to present for purchases who are not necessarily the cardholder responsible for the account) are present, the user interface might allow for any variations of constraints to be selected and be different for different car carriers.

In a permissive variation, the authorization subprocessor never denies an authorization that would have otherwise been granted by the issuer FI or network operator, but just sends a message to the prespecified location when the transaction hits certain constraints. This might be useful where a cardholder needs or wants to observe transactions as they happen, to allow for early intervention. This might be useful for businesses where the card carriers are employees empowered to make purchases for the business.

Cardholder specified constraints, implemented in an authorization system has now been described. As explained, the cardholder can apply constraints to the use of a card, typically to constrain the purchases of other authorized card carriers and of unauthorized users operating with transaction patterns not likely to be used by the cardholder and thus not constraining on the cardholder (e.g., limited to selected countries, times of day, size of transactions that the cardholder would not participate in), but could also be used by the cardholder to constrain the cardholder himself or herself for particular transactions. The latter might be useful for budget controls or controls on inadvertent spending.

As will be understood by those familiar with the art, the present invention may be embodied in other specific forms without departing from the spirit or essential characteristics thereof. For example, the authorization subprocessor can be integrated in with the authorization processor that applies the issuer FI or network operator criteria to the transaction. As another example, while the present invention is described primarily with reference to credit cards, it is also usable for debit card transactions. As yet another example, while the present invention is described primarily with to merchant POS terminals, it should be understood that other systems for initiating purchase transactions might be used instead, without departing from the scope of the invention, such as the use of a merchant payment server, a PC-based cardholder terminal, a telephone, etc. or other location or system a cardholder might interface to in making a purchase, possibly even including systems where the cardholder does not interface to a system at all.

Accordingly, the disclosure of the preferred embodiments of the invention is intended to be illustrative, but not limiting, of the scope of the invention which is set forth in the following claims.

What is claimed is:

1. A system for authorizing use of a card for financial transactions, the card being associated with a cardholder and issued by a financial institution, the system comprising:
   a transaction network coupled to a plurality of merchant devices and operable to receive an authorization request for a financial transaction conducted by any one of the cardholder and an authorized agent of the cardholder from any of the plurality of merchant devices, the authorization request including details of the financial transaction;
   a first authorization processing device in communication with the transaction network and operable to analyze the authorization request using financial institution authorization criteria determined by the financial institution in order to make a first authorization determination for the authorization request; and
   a second authorization processing device in communication with the first authorization processing device and operable to authorize the financial transaction after analyzing the authorization request, and the first authorization determination, and after determining that at least one cardholder-defined and cardholder-modifiable criterion is met, wherein the at least one cardholder-defined and cardholder-modifiable criterion is determined by the cardholder before the financial transaction is conducted, and wherein the at least one cardholder-defined and cardholder-modifiable criterion includes at least one of
   (i) a transaction type allowed by the cardholder,
   (ii) a maximum transaction amount allowed by the cardholder,
   (iii) a transaction frequency allowed by the cardholder,
   (iv) a time period in which the cardholder allows the financial transaction to be conducted,
   (v) a geographic location where the cardholder allows the financial transaction to be conducted,
   (vi) a particular merchant allowed by the cardholder to conduct the financial transaction, and
   (vii) a particular merchant type allowed by the cardholder to conduct the financial transaction,
   wherein the system is further configured to present at least three of the cardholder-modifiable criteria (i)-(vii) to the cardholder and the cardholder is able to modify zero, one, any combination, or all of the presented cardholder-modifiable criteria.

2. The system of claim 1, further comprising an interface configured to allow the cardholder to select the at least one cardholder-defined and cardholder-selectable criterion.

3. The system of claim 1, further comprising a database for storing the at least one cardholder-defined and cardholder-modifiable criterion, the database being in communication with at least the second authorization processing device.

4. The system of claim 1, wherein the financial transaction is chargeable to an account.

5. The system of claim 4, wherein the account is a credit account or a debit account.

6. The system of claim 1, wherein the plurality of merchant devices includes at least one point-of-sale device.

7. The system of claim 1, wherein the second authorization processing device is further configured to provide notification to one of the plurality of merchant devices upon processing the financial transaction.

8. The system of claim 1, wherein the second authorization processing device is further configured to provide notification to the cardholder upon processing the financial transaction.

9. The system of claim 1, further comprising a Web site configured to allow the cardholder to select the at least one cardholder-defined and cardholder-selectable criterion.

10. The system of claim 1 wherein the system is further configured to present at least four of the cardholder-modifiable criteria (i)-(vii) to the cardholder and the cardholder is able to modify zero, one, any combination, or all of the presented cardholder-modifiable criteria.

11. The system of claim 1 wherein the system is further configured to present all of the cardholder-modifiable criteria (i)-(vii) to the cardholder and the cardholder is able to modify zero, one, any combination, or all of the presented cardholder-modifiable criteria.

* * * * *